United States Patent [19]

Lang et al.

[11] 4,068,678

[45] Jan. 17, 1978

[54] VALVE FOR HYDRAULIC SYSTEMS

[75] Inventors: Armin Lang, Schwabisch Gmund; Rolf Fassbender, Mutlangen, both of Germany

[73] Assignee: Zahnradfabrik Friedrichshafen AG, Friedrichshafen, Germany

[21] Appl. No.: 678,607

[22] Filed: Apr. 20, 1976

[30] Foreign Application Priority Data

Apr. 26, 1975 Germany ............................ 2518738

[51] Int. Cl.[2] ............................................ G05D 11/03

[52] U.S. Cl. ...................................... 137/100; 60/429; 60/430; 137/117

[58] Field of Search ......................... 60/428, 429, 430; 137/100, 101, 117

[56] References Cited

U.S. PATENT DOCUMENTS

| | | | |
|---|---|---|---|
| 2,440,371 | 4/1948 | Holley | 137/117 X |
| 2,898,737 | 8/1959 | Rockwell | 60/430 |
| 3,349,714 | 10/1967 | Grenier | 137/117 X |
| 3,882,678 | 5/1975 | Fassbender | 137/117 X |

FOREIGN PATENT DOCUMENTS

| | | | |
|---|---|---|---|
| 1,246,014 | 10/1960 | France. | |
| 1,163,621 | 9/1962 | Germany | 137/101 |

*Primary Examiner*—Robert G. Nilson

*Attorney, Agent, or Firm*—Zalkind & Shuster

[57] ABSTRACT

A valve device having a pressure operable valve piston, particularly for booster steering systems, to selectively control pressure flow to a consumer device such as a hydraulic servomotor in order to permit use of a reserve pump in event of failure of a main pump. The valve in a neutral position blocks the output of both pumps to a sump but is responsive to a first increase in flow rate beyond a predetermined limit to shunt flow from the reserve pump to a sump. Upon further increase in flow rate the valve piston moves to a position to also shunt part of the output from the main pump to a sump. Differential pressure acting on a valve piston effects shifting and means are provided to vary the differential pressure required to shift the valve piston so that a greater differential pressure is needed for the shifting of the valve piston for the partial shunting of the main pump output. Signal means is actuated by movement of the valve piston to apprise a vehicle driver that the valve device is operative.

22 Claims, 5 Drawing Figures

VALVE FOR HYDRAULIC SYSTEMS

Reference is made to U.S. Pat. No. 3,882,678 issued May 13, 1975, showing differential pressure operated valve pistons for controlling main and reserve pump flow in a booster steering system as background subject matter.

Reference is more importantly made to U.S. patent application Ser. No. 668,415, filed March 19, 1976, by the present applicant, incorporated by reference herein, and wherein differential pressure acting through a throttle serves to shift a valve piston to shunt reserve pump flow to a sump upon servomotor system flow rate reaching a predetermined value, and subsequently shunting a portion of main pump flow to a sump upon increase of flow rate.

The basic change over the previous filed application is the provision of means to effect a decrease in throttling effect after the reserve pump output has been shunted to the sump. Accordingly, a greater differential pressure is required for shifting the valve piston to shunt a portion of the main pump flow to the sump. This permits a greater operating range for the main pump and reduces the operating time of the reserve pump insofar as servomotor feed supplied by that pump is required. Thus, the reserve pump output is substantially no-load as long as it is shunted to the sump, yet the reserve pump can cut-in to the load supply should the servomotor flow rate drop to a minimal level, i.e., during engine idling, or in the event of damage to the main pump affecting its output. Since the reserve pump does not have to be designed for constant load it can be lighter built and less expensively.

A further difference resides in the bypassing if the reserve pump flow directly to the consumer instead of initially combining it with main pump flow.

Details of structure omitted in this application are understood to be supplied by Ser. No. 668,415 aforementioned.

In reference thereto the prior disclosure shows an arrangement for precise sequential valving of outputs of main and reserve pumps responsive to flow rate. The magnitudes of the flow rates effecting valve member actuation are almost equal since the force of the biasing spring against which a valve member must move increases very little from a rest or neutral position of the valve member to a first and then second flow control positions of the valve member. Consequently, a slight drop of main pump output causes the reserve pump to be cut in to take part of the load. However, in practice the flow rate absolutely necessary for operational safety can be considerably less than that of the flow rate needed for commercial vehicle steering under high operating speeds.

Accordingly, the present invention provides a valve device having the functions required but maintaining the reserve pump output shunted to a sump so that it operates no-load unless the main pump output drops to a minimum valve required for steering effort.

A detailed description of the invention now follows in conjunction with the appended drawings in which.

Figure 4:
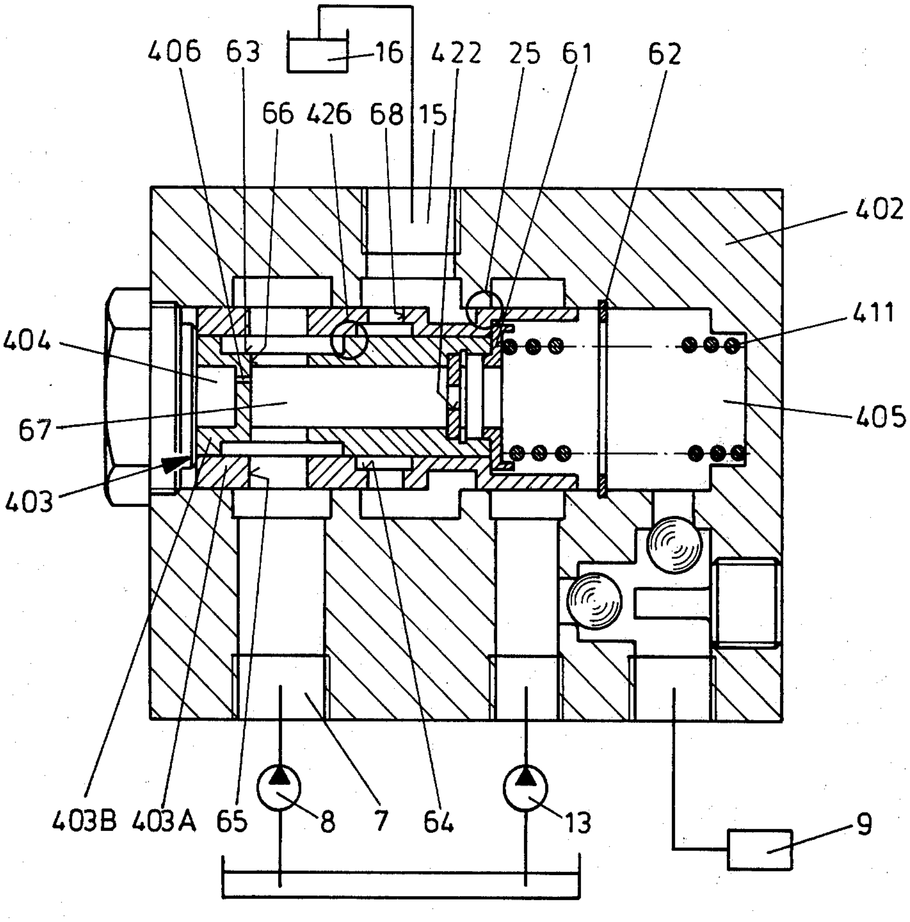
Figure 5:
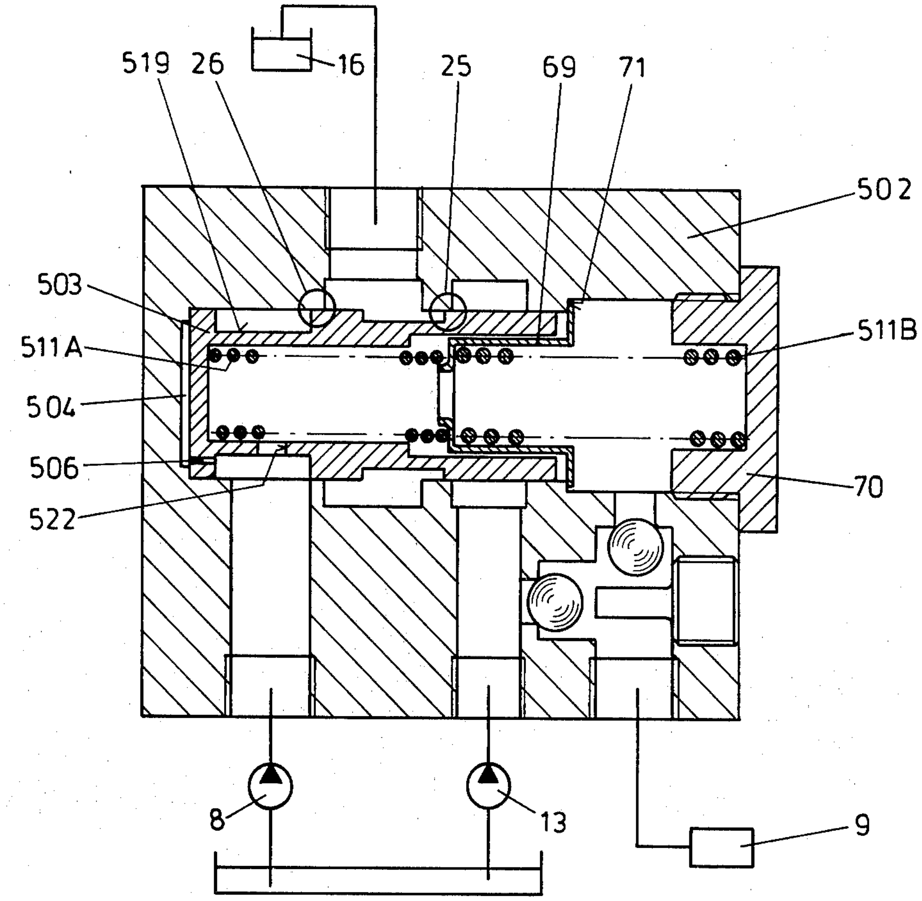

FIG. 4 is a modification wherein the valve member is comprised of two valve pistons concentrically slidable relative to each other such that both valve pistons are subjected to end area force initially but only one valve piston subjected to end area force subsequently so as to necessitate a greater differential pressure for opening a valve member; and FIG. 5 is a modification utilizing a pair of springs arranged in tandem wherein a weaker spring is first overcome for initial movement of a valve member and subsequently a stronger spring must be overcome for movement of the valve member in order to necessitate a greater differential pressure for subsequent movement of the valve member.

Figure 1:
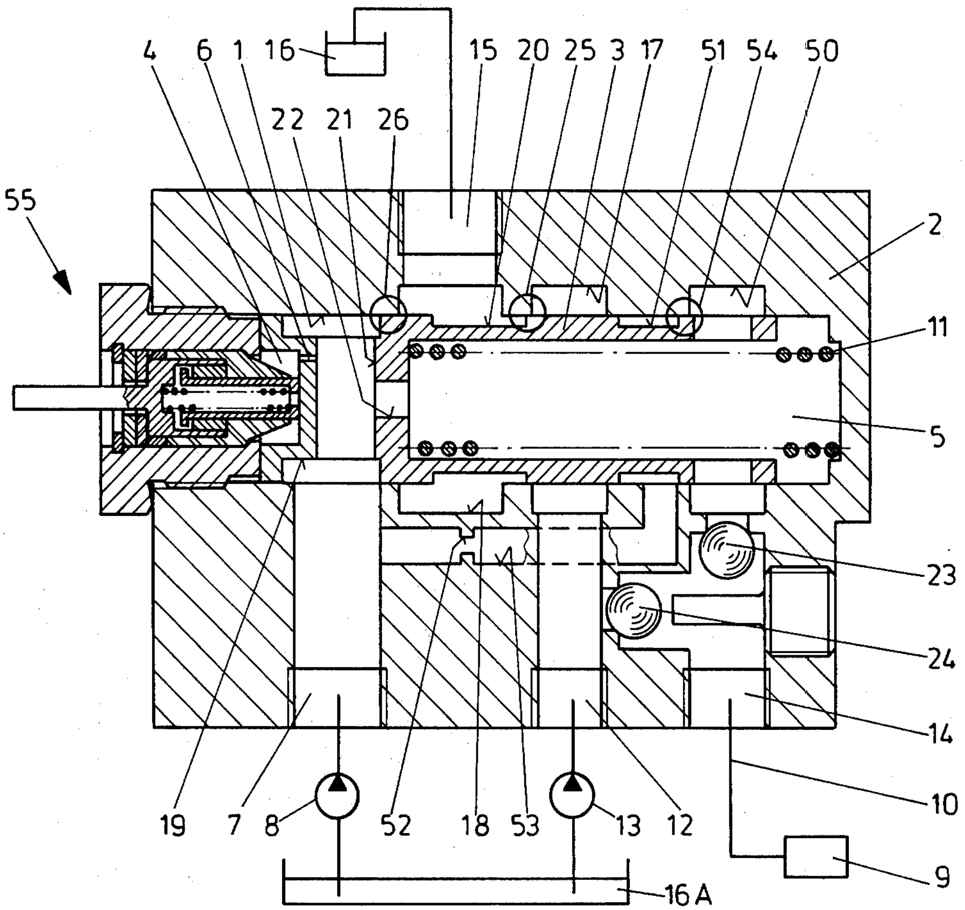
FIG. 1 is a longitudinal cross section showing the basic components of the valve device in a form wherein a pair of throttles are utilized in parallel to provide an equivalent throttle of greater opening in order to necessitate a larger differential pressure to actuate a valve member.

Referring now to FIG. 1, in a bore 1 of a housing 2 a valve member in the form of a tubular valve piston 3 is disposed axially slidable in the bore and having ends exposed to respective pressure chambers 4 and 5, as shown. Pressure chamber 4 is pressurized by a small bore 6 in the wall of valve piston 3, which will be seen to connect with the main pump passage 7 for main pump 8. Bore 6 also serves as a damping bore so that chamber 4 has a slowing or dash-pot effect when the valve member is moving to the neutral position shown in FIG. 1, to prevent sudden impact against the end plug threaded into the bore and carrying a signal indicator switch 55, all as heretofore described in the aforementioned patent application.

The other pressure chamber 5 connects via consumer passage 14 and line 10 with a consumer 9, e.g., the servomotor of a steering mechanism. Disposed intermediate the housing end wall of pressure chamber 5 and in the valve piston is a compression spring 11 effecting a bias means which maintains valve piston 3 in the neutral position. Housing 2 is provided with a reserve pump passage 12 connecting to reserve pump 13 in addition to consumer passage 14 and also with a sump passage 15 connecting to an oil tank or sump 16. It will thus be understood that the passage means to consumer 9 entails various passages in the valve device of FIG. 1 and of the several other modifications disclosed herein, dependent upon their specific structure.

Coacting flow control means by way of grooves in the exterior surface of piston valve 3 and in the surface of bore 1 control the functioning of the valve device, respective grooves suitably dimensioned to coact with each other to sequentially open or close gaps, permitting or blocking flow in a well known manner at flow area control points designated by circles at 25, 26 and 54.

Thus, passages 12 and 15 connect with the grooves 17 and 18 of the bore 1. Groove 19 of valve piston 3 is in constant communication with passage 7 for flow from the main pump 8. Piston valve 3 also has the groove 20 in constant connection with passage 15 for flow to sump 16.

Additionally, bore 1 is provided with groove 50 in constant communication with passage 14 for flow to consumer 9, while valve piston 3 is provided with groove 51 which, in the neutral position of the valve piston as shown, is disposed between the two grooves 17 and 50, but in flow blocking position. Valve piston 3, while tubular, has a solid end wall around which is disposed the groove 19 and radially through which groove is a bore 21 intersecting at its ends with that groove. Bore 21 connects with pressure chamber 4 through the small damping bore 6 and from the description thus far given, it will be apparent that pressure from the main pump 8 flows through main pump passage 7 and fills groove 19 and pressure chamber 4 via bore 6.

A first throttle is provided in the end wall of the valve piston 3 by means of a bore 22 thus connecting bore 21 with the interior of the valve member and providing a downstream pressure in the pressure chamber 5 which will be understood to be reduced as compared with the pressure in pressure chamber 4, due to the throttle effect of throttle 22. Thus, a differential pressure acting on the valve piston is effected intermediate the pressure chambers. A second throttle 52 is disposed in a flow passage 53 interconnecting passage 7 with groove 51 of the valve piston.

A check valve 23 for main pump 8 is disposed between groove 50 and passage 14 of consumer 9 while a second check valve 24 for reserve pump 13 is disposed between passage 12 of reserve pump 13 and passage 14 of consumer 9. Obviously, both check valves 23 and 24 will open downstream in a direction to permit flow toward consumer 9 from the respective pumps. However, the check valves will prevent short circuiting of flow from either pump through the other pump in the event of failure of such other pump. Either check valve will close by pressure from one pump if there is insufficient pressure from the other pump, to prevent bypassing of pressure flow back to supply oil tank 16A.

In the neutral position of valve piston 3 as shown in FIG. 1, effected by the compression spring 11, flow is blocked from both pumps to sump 16 pending a predetermined rise in differential pressure between pressure chambers 4 and 5 sufficient to overcome the prestressed condition of spring 11.

In such neutral position, flow takes place from main pump 8 through throttle 22 and check valve 23 to passage 14 and consumer 9. At the same time flow takes place from reserve pump 13 through check valve 24 and passage 14 to consumer 9 directly without passing through any throttle. This is characteristic of all modifications in the present invention. Thus, only main pump pressure acts to effect differential pressure responsive to its flow rate to the consumer.

It will be noted from the positions of the respective grooves with relation to each other, that in the neutral position of the valve piston there is no flow from either pump to sump 16. At this time flow control points indicated at 25 and 26, where flow gaps would otherwise occur upon shifting of the valve piston, are blocked by overlap of groove edges due to relative positioning of grooves 20 and 17, on the one hand, and grooves 19 and 18, on the other hand. Similarly closed is the flow control point at 54 by virtue of the relative positioning of the edges of grooves 50 and 51. Accordingly, main pump flow communicates only by way of throttle 22 to consumer 9 and there is no flow through the second and smaller throttle 52, such flow being blocked at grooves 50 and 51 at this time.

However, when the flow rate to the consumer from main pump 8 exceeds a predetermined amount, there is an increase in the normal or neutral differential pressure between pressure chamber 4 and 5, causing valve piston 3 to be actuated toward the right against the force of spring 11, a result of the pressure drop through throttle 22. At this time flow control point 25 opens to effect a gap so that flow can take place from the reserve pump 13 to groove 17, groove 20, groove 18 and sump passage 15 to sump 16. Thus a shift of the valve piston to a first position is effected whereby load is removed from the reserve pump since flow now goes to the sump 16 rather than to the consumer 9.

Should the flow rate from main pump 8 still further increase beyond a predetermined limit, a greater pressure differential due to throttle 22 is effected and valve piston 3 is actuated to an intermediate position whereat a gap opens at flow point 54 permitting flow from passage 7 via grooves 50, 51, from the main pump through the second throttle 52, to passage 14 and consumer 9. The output of reserve pump 13 remains connected to sump 16 in this intermediate position.

Accordingly, the main pump 8 flow now feeds through both throttles 22 and 52 in parallel. There is, thus, an equivalent larger throttle opening effected which affords a means for necessitating a larger and disproportionate pressure differential relative to the initial pressure differential if the valve is to be further shifted by differential pressure for safe operation of a consumer system.

The enlargement of throttle area at the intermediate position of the valve piston 3 precludes further shift of the valve piston by constant rise of flow rate, and thus by pressure differential merely proportional to the initial throttling effect. Only a sufficiently increased pressure differential responsive to a disproportionately increased flow rate from the main pump can cause still further actuation of the valve piston to a second position.

This magnified degree of increase in unit pressure in pressure chamber 4 required for further valve member actuation is a function of the reduction of the equivalent throttle effect responsive to flow rate through both throttles in parallel.

Upon such increase, a gap will open at flow control point 26 whereby flow from main pump 8 via grooves 19 and 18 to passage 15 and then to sump 16 is effected for a portion of the output of main pump 8. The output of reserve pump 13 remains connected to sump 16 in this second position.

The groove dimensioning is a matter of design to achieve such sequential control effect as will be noted from consideration of FIG. 1, edges of the grooves being unequal in overlapped length so as to provide the desired sequence of events, a matter of well known design.

In the description of the modification to follow certain features remain the same. Thus, all versions have pressure chambers at respective ends of a valve member. Output of the reserve pump flows directly to the consumer. Check valves for the respective pump output flows are provided. Spring bias means maintains neutral position of the valve member. The coacting grooves effecting flow control points between housing means and valve member opens a shifted valve member first position gap to shunt reserve pump output to a sump and a further shifted second position gap to shunt a portion of main pump output to the sump. However, in FIG. 1, as just explained, and in FIG. 2, to be explained, the valve member takes as intermediate position to effect the required disproportionate increase in differential pressure. Differential pressure is affected only by output of the main pump responsive to flow rate through a throttle.

Figure 2:
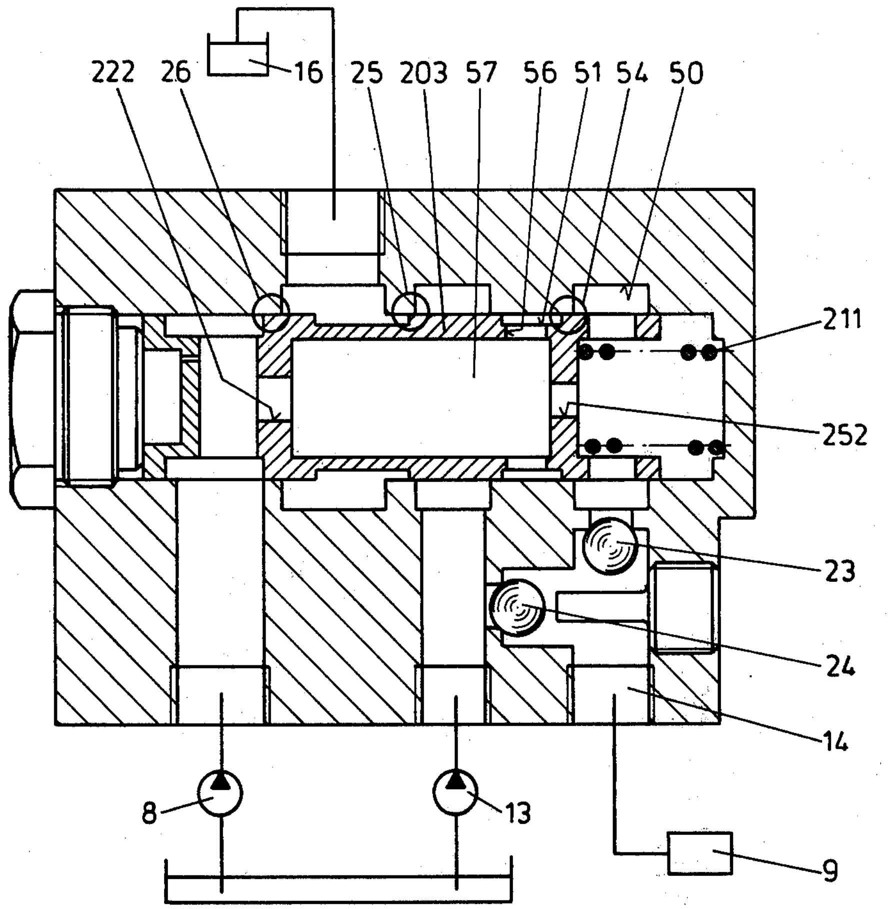
FIG. 2 is a modification wherein throttles are used in series and of different opening sizes wherein the smaller sized throttle is effective for initial movement and the larger sized throttle is effective for subsequent movement so as to necessitate a greater differential pressure to actuate a valve member.

In the modification of FIG. 2 like parts are identified by the same reference numerals as used in FIG. 1 and this same procedure is carried out for all modifications herein.

In FIG. 2 the basic distinction as compared with FIG. 1 is in the provision of a throttle 252 formed as a bore in the otherwise closed downstream end of the valve member such as valve piston 203 and which is flow connected in series with a throttle 222 disposed similarly to throttle 22 of FIG. 1 in the upstream end wall of the valve piston. Both throttles conduct flow in neutral position of the valve member, but throttle 222, being larger, has little throttle effect in the neutral position of the valve position.

Groove 51 in the piston valve communicates via radial bore 56 through the tubular wall with the chamber 57 inside the valve piston and demarcated by the end walls which have the throttles 222 and 252. All flow control points of the coacting housing and piston valve, such as 25, 26 and 54 are closed and the flow from main pump 8 and reserve pump 13 is thus blocked from sump 16. Output from main pump 8 flows through bore 22, chamber 57, throttle 252, and check valve 23 to consumer passage 14 and consumer 9. Output from reserve pump 13 communicates in the same way as described in FIG. 1, passing through check valve 24 to consumer 9 via consumer passage 14.

In the event of flow rate increase beyond the predetermined value from main pump 8 for safe operation of the consumer, valve piston 203 is actuated from neutral position by rise in pressure differential against the force of neutral bias means spring 211, all as explained in the description of FIG. 1. This rise in pressure differential is produced at the throttle 252, the larger opening throttle 222 having little or no throttle effect. The valve piston being thus actuated to a first position, a gap at flow control point 25 resulting, output of reserve pump 13 flows to sump 16, as will be readily apparent. In the event of further rise of rate of flow and thus increased differential pressure, valve piston 203 shifts further to an intermediate position to open a gap at flow control point 54 thereby permitting flow from chamber 57 intermediate the two throttles, such flow taking place through the radial bores 56, groove 51, groove 50, passage 14, to consumer 9. Accordingly, the output from main pump 8 in such intermediate position of the valve piston 203 flows only through throttle 222, the downstream throttle 252 no longer having any throttle effect.

Due to the throttle 222 being larger than throttle 252, a disproportionately larger unit pressure upstream thereof, i.e., greater pressure differential, is required to further shift the piston valve to the point where the flow control point 26 opens to provide a flow gap shunting a portion of the output of main pump 8 to the sump.

In other words, in intermediate position, the throttling effect is smaller, and a greater differential pressure buildup is necessitated beyond that which would be normally caused by proportional or constant flow rate increase subject to the initially larger throttling effect, in order to further shift the valve piston to open the flow control point 26 in the second position.

The details of the signal indicator means have been eliminated in FIG. 2 as in the remaining modifications.

Figure 3:
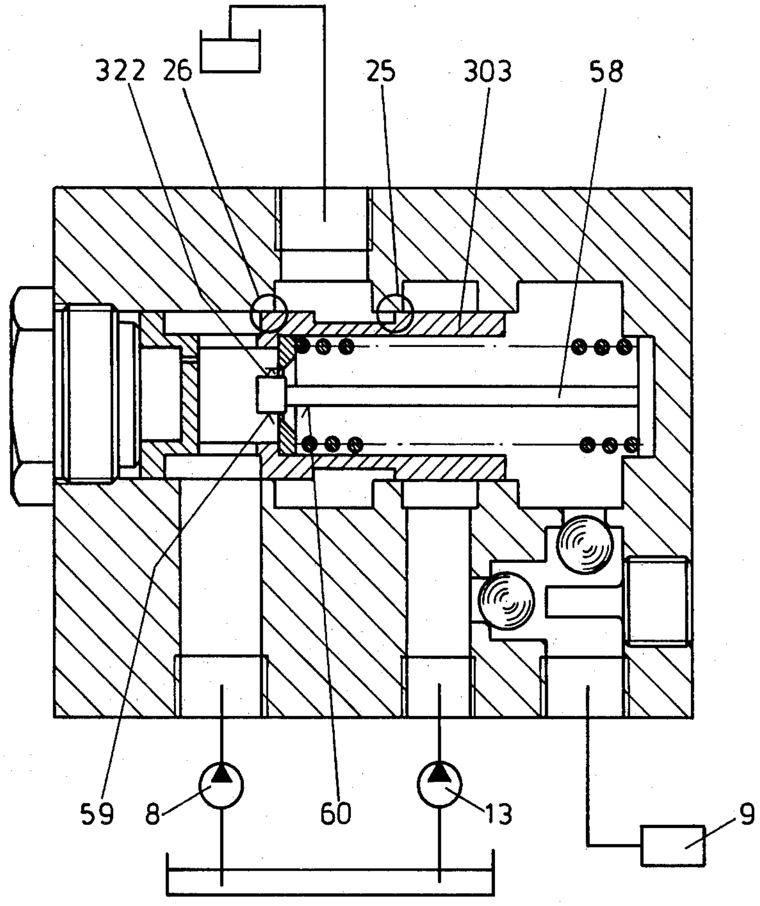
FIG. 3 is a form of the invention which provides for a throttle opening having a restricting member concentric therein, the arrangement being such that relative movement of the valve member which carries the throttle opening will open the throttle area to necessitate a greater differential pressure for actuating a valve member.

Referring to FIG. 3, a single throttle opening 232 is provided in a disc fitted into the tubular piston as shown, the cross section of the throttle opening being changeable by a collar 59 at the upstream end of a pin 58 carried at its other end by housing wall, as shown. The collar 59 has a radial area to provide a flow restriction and thus a greater throttling effect when inside the throttle opening than would the radial area of rod section 60.

In this construction, as compared with the construction shown in FIGS. 1 and 2, the groove 51 and the flow control point 54 are eliminated inasmuch as there is no second throttle to be controlled thereby.

For actuation of valve piston 303 from a neutral position against the spring shown in FIG. 3, the initial differential pressure is determined by throttle 322 as restricted in area by collar 59. The flow control points 125 and 26 are closed. The decreased cross section of flow through the throttle aids in building up differential pressure to the predetermined value desired for increasing throttle opening upon shift of the piston valve. Thus, consumer 9 is fed directly by reserve pump 13 and the main pump 8 output through throttle 322 in a manner now well understood. Upon increase of flow rate causing an increase of differential pressure, the valve piston 303 is shifted to open a gap at flow control point 25, whereupon reserve pump output is shunted to the sump. However, due to relative movement between the valve piston and collar 59, shift of the valve piston moves the throttle opening away from relatively fixed collar 59, thereby increasing that opening. Accordingly, a considerable increased rise in differential pressure, depending upon dimensions of the components, is required to further shift the valve piston in response to increased flow rate to the consumer since obviously the throttling effect of the throttle 322 has been reduced due to its enlargement. In fact, the throttling area has been increased by the difference in cross sectional area between collar 59 and rod end 60. When conditions obtain such that the flow rate reaches a sufficient value to bring about the necessary differential pressure, shifting of the valve piston to a second position opens the flow control point 26 whereby a portion of the output of main pump 8 flows to the sump in the manner hereinabove described.

Referring now to FIG. 4, the coacting flow control means is similar to that in FIG. 3 in that the grooving of the bore in which the valve member slides is the same. In this instance the valve member 403 comprises a pair of concentric slidably related valve pistons 403A and 403B. These valve pistons have bias means such as the compression spring 411 acting against a spring retainer 60 abutting the end shoulder of valve piston 403A and the end of valve piston 403B. Thus, the valve member, i.e., both valve pistons are held against the housing closure plug in neutral position, as shown.

A throttle opening 422 is provided in valve piston 403B by way of an end disc fitted thereinto and locked in place as shown and disposed in the usual manner intermediate pressure chambers 404 and 405 wherein pressure chamber 404 is fed via damping bore 406 from main pump 8. It will be noted that the pressure in pressure chamber 404 acts on both adjacent end surfaces of the valve pistons 403A and 403B which comprise valve member 403.

In the event of increase of flow rate of the main pump, and thus an increase in differential pressure between the two pressure chambers, flow control point 25 will open to effect a gap as both valve pistons shift in unison against spring 411 from the neutral position to a first position. In such first position, the output of reserve pump 13 is shunted to sump 16 so that consumer 9 is fed only by main pump 8. For this first actuation, it will be noted that both valve pistons operate as a single valve member.

The downstream end of valve piston 403A is spaced from a stop ring 62 fixed in the housing as shown.

In the event of further increase of flow rate, the valve member 403 is shifted further until piston valve 403A abuts stop ring 62 halting its further movement. Accordingly, the valve piston 403B is then movable relative to valve piston 403A against spring 411. This effects a reduction in effective area of the valve member that can be acted upon by the pressure in pressure chamber 404. Consequently, an increased rise of differential pressure is necessitated to effect shifting of the valve piston 403B against spring 411 now acting only on that valve piston through the spring retainer 61.

The dimensions of the components are such that a pressure increase predeterminedly beyond that normally effected by constant flow rate rise relative to the full area of valve member 403 acted upon is required to shift the valve piston 403B due to the reduced area acted upon. With such increase, valve piston 403B is shifted to a second position so that flow control point 426 opens a gap whereby a portion of the output of main pump 8 is shunted to sump 16.

Thus, the flow control point 426 is located between an annular groove 63 in valve piston 403B and another annular groove 64 in valve piston 403A, as will be clear from FIG. 4. Accordingly, relative motion between the valve pistons will open a gap at flow point 426 after valve piston 403A has its movement stopped by abutment with stop ring 62.

The flow circuitry of this valve device is obvious in that groove 63 is in constant communication by way of radial bore 65 through valve piston 403A with main pump passage 7 and also in constant communication by way of radial bore 66 in valve piston 403B, with a chamber 67. Chamber 67 is in the interior of tubular valve piston 403B and forms part of the flow passage means for the consumer 9. Further, groove 64 constantly communicates with passage 15 for flow to sump 16 by way of radial bore 68 through the wall of valve piston 403A for the shunting of a portion of the output of the main pump in the second position of the valve member, or specifically, a component, valve piston 403B.

In the form of the invention shown in FIG. 5, valve piston 503 has bias means comprising a pair of compression springs 511A and 511B. These springs are in tandem arrangement and spring 511B is a stronger spring, dominating spring 511A. An open center spring retainer cup or member 69 is disposed between the adjacent ends of the two springs. Spring 511A is inside tubular valve piston 503 and extends between the end wall of the valve piston and the spring retainer and spring 511B extends between the spring retainer and a closure member 70 of the bore in housing 502. The spring retainer 69 has a radial flange abutting a housing shoulder 71 and therefore acting as a stop for spring 511B in the neutral position of the valve piston 503 as shown.

It would, of course, be possible to so design spring 511A by extending it so that it would be disposed against the end wall of the valve piston, passing through the opening in spring retainer 69 to abut against closure 70.

In this embodiment the throttle 522 is provided in the cylindrical wall of the tubular valve piston as a radial bore, while the damping bore 506 communicates directly with the main pump flow passage as shown, so as to provide pressure in pressure chamber 504. Damping bore 506 is through the side wall of valve piston groove 519.

In the event of increase in flow rate beyond a desired point from main pump 8, movement of valve piston 503 will initially compress only spring 511A, this being the weaker spring. Upon sufficient shift of the valve piston 503, to a first position, a gap is open at flow control point 25 whence the output of reserve pump 13 is shunted to sump 16 as in as the other embodiments. Accordingly, and as in the other embodiments, only the output of main pump 8 now feeds consumer 9 through throttle 502.

Upon predetermined increased rate of flow, pressure differential rises between the pressure chambers due to throttle 522, valve piston 503 shifts further to take up the gap against the radial end flange of spring retainer 69. At this time the valve piston must now act against stronger spring 511B and, accordingly, a much greater and relatively disproportionate differential pressure is required for any further shifting of the valve piston. Thus, the differential pressure produced by the output of main pump 8 at the throttle opening 522 is predetermined by the ratio of the pretensioning of the two compression springs 511A and 511B above that differential pressure required for initial shift of the valve piston to the first position. Such subsequent shift of the valve piston to a second position opens a gap at flow control point 26 to shunt a portion of main pump output to sump 16.

Although the signal indicator switch is not shown in FIG. 5, it will be understood that the same arrangement as shown at 55 in FIG. 1 could be utilized by merely providing a bore in the housing end in the general arrangement of FIG. 1.

In retrospect, it will be noted that in all modifications the valve member is shifted from a neutral position to a first position whereat the output of the reserve pump is shunted to the sump. Differential pressures which effect functioning of the valve member are caused only by flow rate of the main pump independently of any flow from the reserve pump. While certain modifications have an intermediate position of the valve member for the purpose of increasing the pressure differential requirements, essentially the valve member, functioning as such for pump shunting has only one other position, namely a second position in which a portion of main pump output is shunted to the sump.

Thus, in FIGS. 1 and 2, there are three flow control points at which gaps in the coacting flow control means can open successively. However, one such gap is only for the purpose of providing for a predetermined increase in pressure differential at a relatively disproportionate higher unit pressure in order to move the valve member to the aforesaid second position. In FIGS. 3, 4 and 5 there is no intermediate flow control point position of the valve member, there being only a gap opening for reserve pump shunting in the first position of the valve member and a gap opening for a portion of main pump shunting in the second position of the valve member. The means for determining the necessary increase of differential pressure in FIGS. 3, 4 and 5, is primarily mechanical in nature as compared with FIGS. 1 and 2 wherein such means is provided by combinations of throttle openings.

The primary advantage of the invention resides in the fact that a large range of flow rate from that at which the reserve pump is shunted and that at which a portion of the main pump is shunted is achieved. Accordingly, the reserve pump will be required to work under load only in the event that the main pump is damaged or unable to provide proper flow rate. As heretofore mentioned, this could occur at any time during operating of an engine but is usually at the time the engine is operating at idle speed. Of course, dependent upon the design parameters of the valve device, as little or as much load running of the reserve pump can be provided. Such matters are arbitrary but it will be appreciated that the invention makes it possible to use a reserve pump which is lightly built and therefore relatively inexpensive since it need not be operating under constant load and, therefore, would be subject fo considerably less wear.

The claims hereunder have been couched in language describing a first and second position shifting or actuation of the valve member or valve piston or pistons, intermediate position being considered as that portion of the invention which relates to determining the requirement of large increased pressure differential in order to gain the advantages of the invention.

What is claimed is:

1. Valve device for a booster steering hydraulic system having a main pump, a reserve pump, and a sump, for operating a pressure operated consumer;

said valve device being for selectively controlling flow to said sump from said pums and comprising means effecting a pair of pressure chambers;

a pressure operable valve member and bias means biasing said valve member to a neutral position relative to said pressure chambers;

said valve member being actuatable by differential pressure between said pressure chambers wherein differential pressure is operative to shift said valve member from said neutral position in opposition to said bias means;

said valve device having pump, sump, and consumer passages for connecting to respective pump outlets and to said sump and consumer;

said valve device having a throttle;

said valve device having passage means whereby flow from said main pump passes through said throttle to said consumer passage and whereby said throttle communicates on opposite sides thereof with respective pressure chambers to effect a differential pressure between said pressure chambers for actuating said valve member responsive to a predetermined pressure differential;

said valve device having coacting flow control means whereby said valve member is operative to block flow from pump passages to said sump passage in said neutral position of said valve member;

actuation of said valve member to a first position responsive to a predetermined degree of differential pressure between said pressure chambers effecting coaction of said flow control means to direct the flow from said reserve pump passage to said sump passage;

increased pressure differential actuating said valve member to a second position to effect a coaction of said flow control means to direct a portion of the flow from the main pump passage to said sump passage;

and flow rate responsive means operative to require a predetermined increase in the flow rate to effect a pressure differential for actuating said valve member to said second position disproportionately greater than the flow rate required for effecting actuation to said first position.

2. Valve device as set forth in claim 1, wherein said valve device has means whereby said reserve pump passage communicates directly with said consumer passage;

only said main pump passage communicating with said pressure chambers whereby actuation of said valve member is responsive to differential pressure effected by main pump flow.

3. Valve device as set forth in claim 2, wherein said flow rate responsive means comprises an additional throttle and throttle passage means therefor to effect a flow path parallel to said first named throttle;

said flow control means coacting to block flow through said additional throttle in neutral position of said valve member and coacting to open flow therethrough when said valve member has been actuated beyond said first position but prior to said second position to effect said parallel path.

4. Valve device as set forth in claim 2, said flow rate responsive means comprising said valve member having a wall with an opening therein effecting said first named throttle and a further wall with an opening therein effecting an additional throttle downstream of and smaller than said first named throttle for series flow;

said flow control means coacting beyond said first position of said valve member but prior to said second position to divert flow from said additional throttle so that flow for determining increased pressure differential is through said first named throttle.

5. Valve device as set forth in claim 2, said valve member having a wall and said throttle opening therethrough;

said flow rate responsive means comprising a flow restriction member normally positioned to restrict flow through said throttle opening in said neutral position of said valve member;

said means whereby said flow restriction member has movement relative to said throttle opening by virtue of actuation of said valve member to reduce flow restriction through said throttle opening to thereby increase the flow rate required for further actuation of said valve member.

6. Valve device as set forth in claim 2, including a housing having a bore;

said valve member being a pair of concentric valve pistons within said housing bore and slidably related to each other and to said housing bore;

said coacting flow control means comprising registerable grooves in said valve pistons and in said housing bore connecting with respective pump and sump passages for valve piston positions;

means whereby said valve pistons are initially actuatable in unison by differential pressure in said pressure chambers wherein differential pressure force acts on both valve pistons against said bias means;

an abutment in said housing to stop movement of one of said valve pistons for said first position of said valve member after registering of respective coacting grooves to effect said flow from said reserve pump passage to said sump passage;

wherein differential pressure then acts only on the other of said valve pistons against said bias means to thus require disproportionately greater differential pressure to effect registering of respective coacting grooves for said flow from said main pump passage to said sump passage in said second position of said valve member.

7. Valve device as set forth in claim 2, said pressure differential determining means comprising variable rate spring means to initially permit actuation of said valve member at a predetermined differential pressure to said first position and subsequently to require higher differential pressure for actuation to said second position against a disproportionately greater spring rate.

8. Valve device as set forth in claim 2, said pressure differential determining means comprising a first spring in said bias means and acting against said valve member to effect said neutral position;

a second spring stronger than said first spring;

and means whereby initial differential pressure effects actuation of said valve member to said first position by compression of said first spring and disproportionately increased differential pressure is required to effect compression to said second spring wherein said valve member is moved to said second position.

9. Valve device as set forth in claim 2, including a housing with a bore;

said valve member being slidable in said bore and being tubular;

a first spring in said valve member and effecting said bias means to bias said valve member to said neutral position;

a spring retaining member and a second spring retained thereby and dominating said first spring and being in tandem therewith;

a shoulder in said bore positioning said spring retaining member;

said spring retaining member being engageable by said valve member to transmit stress to said second spring when said valve member has reached said first position responsive to predetermined differential pressure whereby said spring retaining member is actuated by said valve member upon dispropro-tionately increased differential pressure to stress said second spring wherein said valve member is actuated to said second position.

10. Valve device as set forth in claim 1, including a housing having a bore;

said valve member being movable in said bore;

said pressure chambers being at respective ends of said bore on respective opposite ends of said valve member;

said passage means whereby flow from said main pump passes through said throttle to said consumer passage comprising the pressure chamber downstream of said throttle;

and said valve device having means whereby said reserve pump passage communicates directly with said consumer passage;

only said main pump passage communicating with said pressure chambers whereby actuation of said valve member is responsive to differential pressure effected by main pump flow.

11. Valve device as set forth in claim 1, wherein said pressure differential determining means comprises an additional throttle and throttle passage means therefor to effect a flow path parallel to said first named throttle;

said flow control means coacting to block flow through said additional throttle in neutral position of said valve member and coacting to open flow therethrough when said valve member has been actuated beyond said first position but prior to said second position to effect said parallel path.

12. Valve device as set forth in claim 1, including a housing means;

said throttle passage means being a bore in said housing means and interconnecting said main pump passage with said coacting flow control means;

said additional throttle being comprised in said throttle passage means;

said coacting flow control means comprising grooves in said housing means and in said valve member registerable to conduct flow upon shift of said valve member.

13. Valve device as set forth in claim 1, said pressure differential determining means comprising said valve member having a wall with an opening therein effecting said first named throttle and a further wall with an opening therein effecting an additional throttle downstream of and smaller than said first named throttle for series flow;

said flow control means coacting beyond said first position of said valve member but prior to said second position to divert flow from said additional throttle so that flow for determining increased pressure differential is through said first named throttle.

14. Valve device as set forth in claim 1, said valve member having a wall and said throttle opening therethrough;

said flow rate responsive means comprising a flow restriction member normally positioned to restrict flow through said throttle opening in said neutral position of said valve member;

and means whereby said flow restriction member has movement relative to said throttle opening by virtue of actuation of said valve member to reduce flow restriction through said throttle opening to thereby increase the flow rate required for further actuation of said valve member.

15. Valve device as set forth in claim 14, said valve device comprising a housing having a bore in which said valve member is shiftable and having a wall;

said flow restriction member comprising a support carried by said housing wall and having a flow restriction portion positioned in said throttle opening sized for partial blocking of flow therethrough when said valve member is in neutral position.

16. Valve device as set forth in claim 1, including a housing having a bore;

said valve member being a pair of concentric valve pistons within said housing bore and slidably related to each other and to said housing bore;

said coacting flow control means comprising registerable grooves in said valve pistons and in said housing bore connecting with respective pump and sump passages for valve piston positions;

means whereby said valve pistons are initially actuatable in unison by differential pressure in said pressure chambers wherein differential pressure force acts on both valve pistons against said bias means;

an abutment in said housing to stop movement of one of said valve pistons for said first position of said valve member after registering of respective coacting grooves to effect said flow from said reserve pump passage to said sump passage;

wherein increased flow rate increases differential pressure only on the other of said valve pistons against said bias means to thus require disproportionately greater differential pressure to effect registering of respective coacting grooves for said flow from said main pump passage to said pump passage in said second position of said valve member.

17. Valve device as set forth in claim 16, said bias means comprising a ring in said bore and a spring acting against said ring for engaging said valve pistons to bias said valve member comprising said valve pistons to said neutral position;

said one valve piston having a portion disposed for engagement with said abutment for said first valve member position whereby continued movement to the other said valve piston against said ring subsequent to said engagement is effected against bias of said spring to said second position of said valve member;

said throttle being carried within said other valve piston wherein flow therethrough passes through said ring into one said pressure chamber;

said one pressure chamber being comprised in said passage means for flow from said main pump passage to said consumer passage.

18. Valve device as set forth in claim 1, said flow rate responsive means comprising variable rate spring means to initially permit actuation of said valve member at a predetermined differential pressure to said first position and subsequently to require higher differential pressure for actuation to said second position against a disproportionately greater spring rate.

19. Valve device as set forth in claim 1, said flow rate responsive means comprising a first spring in said bias means and acting against said valve member to effect said neutral position;

a second spring stronger than said first spring;

and means whereby initial differential pressure effects actuation of said valve member to said first position by compression of said first spring and disproportionately increased differential pressure is required to effect compression of said second spring wherein said valve member is moved to said second position.

20. Valve devices as set forth in claim 1, said flow rate responsive means comprising a pair of springs arranged in tandem and acting against said valve member;

means whereby an initial differential pressure actuates said valve member to said first position against one of said springs and means whereby an increased differential pressure actuates such valve member to said second position against the other of said springs wherein said other spring has a greater spring rate than said one spring.

21. Valve device as set forth in claim 1, including a housing with a bore;

said valve member being slidable in said bore and being tubular;

a first spring in said valve member and effecting said bias means to bias said valve member to said neutral position;

a spring retaining member and a second spring retained thereby and dominating said first spring and being in tandem therewith;

a shoulder in said bore positioning said spring retaining member;

said spring retaining member being engageable by said valve member to transmit stress to said second spring when said valve member has reached said first position responsive to predetermined differential pressure whereby said spring retaining member is actuated by said valve member upon disproportionately increased differential pressure to stress said second spring wherein said valve member is actuated to said second position.

22. Valve device as set forth in claim 21, said throttle being a bore through the tubular wall of said valve member;

said spring retaining member being located downstream of said throttle and having an opening in said passage means.

* * * * *